(12) United States Patent
Shirahama

(10) Patent No.: US 11,613,635 B2
(45) Date of Patent: Mar. 28, 2023

(54) RESIN COMPOSITION FOR MANUFACTURING MEDICAL STORAGE CONTAINER, SHEET AND MEDICAL STORAGE CONTAINER

(71) Applicant: SB-KAWASUMI LABORATORIES, INC., Kanagawa (JP)

(72) Inventor: Noriaki Shirahama, Oita (JP)

(73) Assignee: SB-KAWASUMI LABORATORIES, INC., Kanagawa (JP)

( * ) Notice: Subject to any disclaimer, the term of this patent is extended or adjusted under 35 U.S.C. 154(b) by 237 days.

(21) Appl. No.: 16/645,810

(22) PCT Filed: Sep. 18, 2018

(86) PCT No.: PCT/JP2018/034422
§ 371 (c)(1),
(2) Date: Mar. 10, 2020

(87) PCT Pub. No.: WO2019/059170
PCT Pub. Date: Mar. 28, 2019

(65) Prior Publication Data
US 2020/0277476 A1   Sep. 3, 2020

(30) Foreign Application Priority Data
Sep. 25, 2017 (JP) .............................. JP2017-184044

(51) Int. Cl.
*C08L 23/06* (2006.01)
*A61J 1/10* (2006.01)

(52) U.S. Cl.
CPC ................ *C08L 23/06* (2013.01); *A61J 1/10* (2013.01); *C08L 2205/025* (2013.01); *C08L 2205/035* (2013.01); *C08L 2207/04* (2013.01)

(58) Field of Classification Search
CPC .......... C08L 23/06; C08L 23/0815; A61J 1/10
See application file for complete search history.

(56) References Cited

U.S. PATENT DOCUMENTS

| | | | |
|---|---|---|---|
| 2012/0014625 A1* | 1/2012 | Igarashi | B32B 27/327 428/218 |
| 2012/0328842 A1 | 12/2012 | Afshari | |
| 2013/0302696 A1 | 11/2013 | Ishihara | |

FOREIGN PATENT DOCUMENTS

| | | |
|---|---|---|
| JP | 04-210061 A | 7/1992 |
| JP | 05-237165 A | 9/1993 |
| JP | 05-317385 A | 12/1993 |
| JP | 08188687 A * | 7/1996 |
| WO | 2010098322 A1 | 9/2010 |

OTHER PUBLICATIONS

International Search Report from International Application No. PCT/JP2018/034422 dated Nov. 6, 2018.
Extended European Search Report dated Jul. 14, 2021.

* cited by examiner

*Primary Examiner* — Mark S Kaucher
(74) *Attorney, Agent, or Firm* — Brundidge & Stanger, P.C.

(57) ABSTRACT

The purpose of the present invention is to provide a resin composition for manufacturing a medical storage container that has improved oxygen permeability and that tends not to have excessively lower transparency. To this end, the present invention pertains to a resin composition for manufacturing a medical storage container, the composition including polyethylene (a) and polymethylpentene (b). The resin composition contains, as polyethylene (a), a first polyethylene (a-1), which is a main component of the polyethylene (a), and a second polyethylene (a-2) having a lower density than the first polyethylene.

8 Claims, No Drawings

RESIN COMPOSITION FOR MANUFACTURING MEDICAL STORAGE CONTAINER, SHEET AND MEDICAL STORAGE CONTAINER

TECHNICAL FIELD

The present invention relates to a resin composition for manufacturing a medical storage container, a sheet, and a medical storage container.

BACKGROUND ART

As blood products, "blood components for transfusion", which include whole human blood (whole blood) and products in which components such as red blood cells, platelets, and plasma have been separated and adjusted from human blood, and "blood plasma fraction", in which proteins such as albumin, immunoglobulin, and blood coagulation factor and the like included in plasma has been separated and removed, are known. These blood products have conventionally been stored in containers made of glass, polyvinyl chloride, polyolefin, and the like. In particular, containers made of polyolefins having high oxygen permeability have been widely used for preservation of platelets and the like, which require metabolism to be maintained.

As a container for storing platelets, for example, Patent Document 1 describes a platelet storage container formed from a polymer composition composed of linear low-density polyethylene, which is a copolymer of ethylene and an α-olefin having three or more carbon atoms, polypropylene, and a rubber component such as styrene-ethylene-butene-styrene block copolymer (SEBS).

Furthermore, Patent Document 2 describes a blood component storage bag prepared from a polymer mixture containing a hydrogenated block copolymer such as SEBS, polypropylene, and a linear ethylene-α-olefin copolymer.

PRIOR ART DOCUMENT

Patent Document

Patent Document 1: Japanese Unexamined Patent Application Publication No. H04-210061
Patent Document 2: Japanese Unexamined Patent Application Publication No. H05-237165

SUMMARY OF THE INVENTION

Technical Problem

As described in Patent Document 1 and Patent Document 2, it is known that blood product storage containers manufactured from polyolefins such as polyethylene and the like have high oxygen permeability. However, for example, even though the expiration date of platelet products is three days in Japan, five to seven days is the mainstream internationally, and blood product storage containers that enable blood products to be stored over longer periods of time are sought.

Therefore, the present inventors attempted to manufacture a blood product storage container by using polymethylpentene, which has high oxygen permeability, instead of polypropylene in resin compositions for manufacturing a blood product storage container containing polyethylene, polypropylene and SEBS, such as those described in Patent Document 1 and Patent Document 2. Consequently, it was found that although the oxygen permeability increased due to the incorporation of polymethylpentene, haze occurred instead in the blood product storage container, causing a decrease in transparency. When the transparency of a blood product storage container decreases, it becomes difficult to observe the state of the stored blood product (for example, the form of the platelets) from the outside of the container, and it becomes difficult to determine the deterioration of the blood product, and therefore, it is desirable for the transparency of the blood product storage container to be higher.

The above problems can occur in medical storage containers other than blood product storage containers, such as cord blood storage containers for storing cord blood, and cell storage containers for storing liquids for culturing hematopoietic stem cells and the like.

The present invention has been made in view of the problems above, and has an object of providing a resin composition for manufacturing a medical storage container that enhances oxygen permeability without significantly reducing transparency, and a sheet and a medical storage container manufactured from the resin composition.

Solution to Problem

The problems above are solved by a resin composition for manufacturing a medical storage container, the composition including polyethylene (a); and polymethylpentene (b); wherein the polyethylene (a) contains a first polyethylene (a-1), which is a main component of the polyethylene (a), and a second polyethylene (a-2) having a higher density than the first polyethylene (a-1).

Furthermore, the above problems are solved by a sheet formed by molding the resin composition, a medical storage container having a storage portion formed by molding the sheet into a bag shape, or a medical storage container having a storage portion formed by molding the resin composition into a bag shape.

Advantageous Effect of the Invention

According to the present invention, a resin composition for manufacturing a medical storage container is provided that enhances oxygen permeability without significantly reducing transparency, and further, a sheet and a medical storage container manufactured from the resin composition are provided.

DESCRIPTION OF THE EMBODIMENT

1. Resin Composition

A resin composition according to an embodiment of the present invention refers to a resin composition for manufacturing a medical storage container (sometimes simply referred to as a storage container below) and a sheet used for manufacturing a storage container (sometimes simply referred to as a sheet below), and is a resin composition containing polyethylene (a).

1-1. Polyethylene (a)

The polyethylene (a) is a homopolymer of ethylene or a copolymer mainly composed of ethylene and an α-olefin.

Examples of the α-olefin above include α-olefins having 3 to 10 carbon atoms, such as propylene, 1-butene, 1-pentene, 1-hexene, 4-methyl-1-pentene, 1-heptene, 1-octene, 1-nonene, and 1-decene. The polyethylene (a), which is a copolymer, may contain monomer units derived only from one of these compounds, or may contain monomer units derived from a plurality of the compounds.

The polyethylene (a) includes a first polyethylene (a-1), which is a main component, and a second polyethylene (a-2) having a higher density than the first polyethylene. The fact that the first polyethylene (a-1) is the main component indicates that, among the plurality of types of polyethylene having different densities included in the resin composition, the first polyethylene (a-1) accounts for the largest proportion of the mass. Therefore, the content of the second polyethylene (a-2) is smaller than the content of the first polyethylene (a-1).

The first polyethylene (a-1) and the second polyethylene (a-2) are two types of polyethylene at least having different densities. According to an investigation by the present inventors, because polymethylpentene has a relatively low miscibility with other resins, when a sheet or a storage container is prepared using a resin composition containing polymethylpentene, the resins tend not to be sufficiently mixed in the resin composition, which is thought to result in phase separation of the resins inside the formed sheet or inside the storage portion of the storage container, and generate haze. On the other hand, when two types of polyethylene having different densities are used, the first polyethylene (a-1), which is the main component, imparts transparency and flexibility to the sheet or the storage container, and the second polyethylene (a-2), which has a higher density and higher crystallinity, suppresses the generation of haze by crystallizing the resin composition more uniformly, which is thought to further enhance the transparency of the sheet or the storage container.

The density difference between the first polyethylene (a-1) and the second polyethylene (a-2) is preferably 0.020 g/cm$^3$ or more and 0.100 g/cm$^3$ or less, more preferably 0.020 g/cm$^3$ or more and 0.070 g/cm$^3$ or less, even more preferably 0.025 g/cm$^3$ or more and 0.045 g/cm$^3$ or less, and particularly preferably 0.025 g/cm$^3$ or more and 0.035 g/cm$^3$ or less. When the density difference is 0.020 g/cm$^3$ or more, the occurrence of haze in the sheet or in the storage container is more easily suppressed. When the density difference is 0.100 g/cm$^3$ or less, it is possible to further enhance the oxygen permeability of the sheet or the storage container.

The first polyethylene (a-1) and the second polyethylene (a-2) may each be selected from high-density polyethylene (HDPE, for example, having a density of 0.942 g/cm$^3$ or more), medium-density polyethylene (MDPE, for example, having a density of 0.930 g/cm$^3$ or more and less than 0.942 g/cm$^3$), low-density polyethylene (LDPE, for example, having a density of 0.910 g/cm$^3$ or more and less than 0.930 g/cm$^3$), linear low-density polyethylene (LLDPE having the same density as low density polyethylene), ultra-low-density polyethylene (VLDPE/ULDPE, for example, having a density of 0.900 g/cm$^3$ or more and less than 0.910 g/cm$^3$), polyethylene having a lower density than ultra-low-density polyethylene (for example, having a density of less than 0.900 g/cm$^3$), and the like. Among these, from the perspective of further increasing the transparency and flexibility of the sheet or the storage container, the first polyethylene (a-1) is preferably selected from polyethylenes having a lower density than ultra-low-density polyethylene. Furthermore, the second polyethylene (a-2) is preferably selected from low density polyethylene, ultra-low density polyethylene and linear low density polyethylene, and preferably selected from linear low density polyethylenes.

Specifically, the density of the first polyethylene (a-1) is preferably 0.860 g/cm$^3$ or more and 0.890 g/cm$^3$ or less, and is more preferably 0.860 g/cm$^3$ or more and 0.885 g/cm$^3$ or less. When the density of the first polyethylene (a-1) is 0.860 g/cm$^3$ or more, a sufficient strength is easily imparted to the sheet or the storage container, and sticking to the surface of the sheet or the storage container is more easily suppressed. When the density of the first polyethylene (a-1) is 0.890 g/cm$^3$ or less, the occurrence of haze in the sheet or in the storage container is more easily suppressed by increasing the density difference with the second polyethylene (a-2).

Furthermore, the density of the second polyethylene (a-2) is preferably 0.900 g/cm$^3$ or more and 0.970 g/cm$^3$ or less, more preferably 0.900 g/cm$^3$ or more and 0.950 g/cm$^3$ or less, and even more preferably 0.900 g/cm$^3$ or more and 0.930 g/cm$^3$ or less. When the density of the second polyethylene (a-2) is 0.900 g/cm$^3$ or more, the occurrence of haze in the sheet or in the storage container is more easily suppressed by increasing the density difference with the first polyethylene (a-1). When the density of the second polyethylene (a-2) is 0.970 g/cm$^3$ or less, it is possible to further enhance the oxygen permeability of the sheet or the storage container.

The densities of the first polyethylene (a-1) and the second polyethylene (a-2) may be obtained using values published by manufacturers, or using values measured by a density gradient tube method conforming to ASTM D 1505 (2010).

The first polyethylene (a-1) and the second polyethylene (a-2) may each be a polyethylene synthesized using a Ziegler-Natta catalyst, or a polyethylene synthesized using a metallocene catalyst. Among these, from the perspective of further enhancing the transparency of the sheet or the storage container, it is preferable for at least one of the first polyethylene (a-1) and the second polyethylene (a-2) to be a polyethylene synthesized using a metallocene catalyst, and more preferable for both to be synthesized using a metallocene catalyst.

The number average molecular weight (Mn) of both the first polyethylene (a-1) and the second polyethylene (a-2) is preferably 15,000 or more and 100,000 or less, and more preferably 15,000 or more and 50,000 or less. When the Mn is within the ranges mentioned above, it is possible to further enhance the moldability of the resin composition, and the strength of the sheet or the storage container.

The Mw/Mn of both the first polyethylene (a-1) and the second polyethylene (a-2), which is a value obtained by dividing the weight average molecular weight (Mw) by the number average molecular weight, is preferably 1.0 or more and 7.0 or less, preferably 2.0 or more and 7.0 or less, and preferably 3.0 or more and 6.0 or less. When the Mw/Mn is within the ranges mentioned above, it is possible to further enhance the moldability of the resin composition, and the strength and the transparency of the sheet or the storage container.

The Mn and the Mw/Mn of the first polyethylene (a-1) and the second polyethylene (a-2) may be obtained using values published by manufacturers, or using a value obtained by a measurement from a gel permeation chromatography (GPC) followed by conversion using a calibration curve prepared from polystyrene.

The melt flow rate (MFR) of both the first polyethylene (a-1) and the second polyethylene (a-2) is preferably 0.05 g/10 min or more and 15.0 g/10 min or less, more preferably 0.10 g/10 min or more and 10.0 g/10 min or less, and even more preferably 0.30 g/10 min or more and 10.0 g/10 min or less. When the MFR is within the ranges mentioned above, it is possible to further enhance the moldability of the resin composition.

The MFR of the first polyethylene (a-1) and the second polyethylene (a-2) may be obtained using values published by manufacturers, or using values measured by a mass determination method conforming to JIS K 7210-1 (2014).

The melting peak temperature (Tpm) of both the first polyethylene (a-1) and the second polyethylene (a-2) obtained by the differential scanning calorimetry method (DSC) is preferably 90° C. or less.

The melting peak temperature (Tpm) of the first polyethylene (a-1) and the second polyethylene (a-2) may be obtained using values published by manufacturers, or using the maximum peak temperature of a thermogram obtained when the temperature is increased at a rate of 4° C./min using a differential scanning calorimeter.

The resin composition may include three or more types of polyethylene with different densities.

1-2. Polymethylpentene (b)

The polymethylpentene (b) is a homopolymer of 4-methyl-1-pentene, or a copolymer mainly composed of 4-methyl-1-pentene, such as a copolymer of 4-methyl-1-pentene and ethylene or a copolymer of 4-methyl-1-pentene and an α-olefin other than 4-methyl-1-pentene.

Examples of the α-olefin above include α-olefins having 2 to 10 carbon atoms, such as ethylene, propylene, 1-butene, 1-pentene, 1-hexene, 1-heptene, 1-octene, 1-nonene, and 1-decene. When the polymethylpentene (b) is a copolymer, it may contain monomer units derived from only one of these compounds, or may contain monomer units derived from a plurality of the compounds.

The polymethylpentene (b) is a resin having high oxygen permeability, and is capable of further enhancing the oxygen permeability of the sheet or the storage container.

The MFR of the polymethylpentene (b) is preferably 3.0 g/10 min or more and 20.0 g/10 min or less. When the MFR is within the range mentioned above, it is possible to further enhance the moldability of the resin composition.

The density of the polymethylpentene (b) is preferably 0.800 g/cm$^3$ or more and 0.900 g/cm$^3$ or less. When the density is within the range mentioned above, it is possible to further enhance the transparency of the sheet or the storage container because of the high miscibility with polyethylene, and further, the sheet or the storage container can be made lightweight, and it is possible to further enhance the strength of the sheet or the storage container.

The melting peak temperature (Tpm) of the polymethylpentene (b) measured by DSC is preferably 180° C. or less, and more preferably 130° C. or less. When the Tpm is 180° C. or less, it is possible to further enhance the oxygen permeability of the sheet or the storage container.

The MFR, the density, and the Tpm of the polymethylpentene (b) may be obtained using values published by manufacturers, or using values obtained by the same methods as those measurement methods described above for the first polyethylene (a-1) and the second polyethylene (a-2).

1-3. Hydrogenated Block Copolymer (c)

The resin composition described above may further include a hydrogenated block copolymer (c) formed by hydrogenation of a block copolymer containing at least two polymer blocks A mainly composed of a monomer unit derived from a vinyl aromatic compound, and containing at least one polymer block B mainly composed of a monomer unit derived from a conjugated diene compound.

As a result of further including the hydrogenated block copolymer (c), it is possible to further enhance the flexibility and the rubber elasticity of the sheet or the storage container.

In the present specification, "mainly composed of" indicates that, among the monomer units included in a polymer block, the monomer unit accounts for 50 mass % or more, and more preferably 70 mass % or more.

The hydrogenated block copolymer (c) is a hydrogenated block copolymer formed by hydrogenation of a block copolymer containing at least two of the polymer block A, and at least one of the polymer block B, and for example, it has a structure such as A-B-A, B-A-B-A, A-B-A-B-A, B-A-B-A-B, (A-B)$_4$—Si, (B-A-B)$_4$—Si, (A-B)$_4$—Sn, or (B-A-B)$_4$—Sn. Si represents a residue of a coupling agent such as silicon tetrachloride, and Sn represents a residue of a coupling agent such as tin tetrachloride.

Furthermore, the hydrogenated block copolymer (c) is preferably a hydrogenated block copolymer formed by hydrogenation of a block copolymer having the polymer block B described above on at least one of the polymer end, and preferably has, for example, a structure such as B-A-B-A, B-A-B-A-B, (B-A-B)$_4$—Si, (B-A-B)$_3$—Si—R, (B-A-B)$_4$—Sn, (B-A-B)$_3$—Sn—R, (B-A-B)$_2$—Si—R,R'(A-B), (B-A-B)—Si—R,R'(A-B), or (B-A-B)$_2$—Si—R. In the above formulas, R and R' independently represent an alkyl group having 1 to 8 carbon atoms. Such a hydrogenated block copolymer increases the flexibility and the processability of the sheet or the storage container, and can reduce anisotropy.

Furthermore, in the polymer block A and the polymer block B, the distribution of the monomer unit derived from the vinyl aromatic compound and the monomer unit derived from the conjugated diene compound in each polymer block may be random, or may be tapered (wherein a monomer component increases or decreases along the molecular chain), or may further partially form blocks within the polymer block.

When the hydrogenated block copolymer (c) includes at least two of the polymer blocks A, it may include only a single type of polymer block A having the same structure, or a plurality of types of polymer blocks A having different structures. The hydrogenated block copolymer (c) may include, as the two or more polymer blocks B, only a single type of polymer block B having the same structure, or a plurality of types of polymer blocks B having different structures.

The number average molecular weight (Mn) of the polymer block A is preferably 4,000 or more and 50,000 or less, and more preferably 5,000 or more and 40,000 or less. The number average molecular weight (Mn) of the polymer block B is preferably 3,000 or more and 100,000 or less, and more preferably 4,000 or more and 70,000 or less.

The monomer unit derived from the vinyl aromatic compound contained in the polymer block A described above may be, for example, a monomer unit derived from styrene, vinyltoluene, α-methylstyrene, p-tert-butylstyrene, or the like. Among these, styrene is preferred as the monomer unit derived from the vinyl aromatic compound. The monomer unit derived from the vinyl aromatic compound described above may be a monomer unit derived from one type of vinyl aromatic compound among the above vinyl aromatic compounds, or a plurality of types of monomer units derived from a plurality of types of the above vinyl aromatic compounds.

The monomer unit derived from the conjugated diene compound included in the polymer block B described above may be, for example, a monomer unit derived from butadiene, isoprene, 1,3-pentadiene, 2,3-dimethyl-1,3-butadiene, or the like. Among these, the monomer unit derived from the conjugated diene compound is preferably butadiene (which affords a styrene-ethylene-butene-styrene block copolymer (SEBS)) or isoprene (which affords styrene-ethylene-propylene-styrene block copolymer (SEPS)), and is more preferably butadiene. The monomer unit derived from the conjugated diene compound described above may be a monomer unit derived from one type of conjugated diene compound among the above conjugated diene compounds, or a plurality of types of monomer units derived from a plurality of types of the above conjugated diene compounds.

In the polymer block B described above, for example, a 1,2-bonded polybutadiene structure is included in the block in which the monomer derived from butadiene is joined, preferably in an amount of 10 mass % or more and 50 mass % or less relative to the total mass of the polymer block B, and more preferably in an amount of 15 mass % or more and 40 mass % or less.

In the hydrogenated block copolymer (c), relative to the total number of monomer units derived from the vinyl aromatic compound included in the polymer block A, it is preferable for less than 20% of the monomer units to be hydrogenated, and more preferable for less than 10% of the monomer units to be hydrogenated. Furthermore, in the hydrogenated block copolymer (c), relative to the total number of monomer units derived from the conjugated diene compound included in the polymer block B, it is preferable for 80% or more of the monomer units to be hydrogenated, and more preferable for 90% or more of the monomer units to be hydrogenated.

In the hydrogenated block copolymer (c), relative to the entire mass of the copolymer, it is preferable for the monomer unit derived from the vinyl aromatic compound to be included in an amount of 10 mass % or more and 50 mass % or less, and more preferably to be included in an amount of 15 mass % or more and 40 mass % or less.

The number average molecular weight (Mn) of the hydrogenated block copolymer (c) is preferably 50,000 or more and 250,000 or less, and more preferably 70,000 or more and 200,000 or less. If the Mn of the hydrogenated block copolymer (c) is 50,000 or more, it is possible to further enhance the strength and the oil resistance of the sheet or the storage container. If the Mn of the hydrogenated block copolymer (c) is 200,000 or less, it is possible to further enhance the moldability of the sheet or the storage container.

The Mw/Mn of the hydrogenated block copolymer (c) is preferably 10 or less, more preferably 5 or less, and even more preferably 2 or less.

1-4. Other Components

The resin composition described above may further include known additives including antioxidants, plasticizers, silicone oils, antiblocking agents, ultraviolet absorbers, lubricants, and processing aids.

1-5. Content of Components

The resin composition may contain each of the components described above in an arbitrary content as long as the oxygen permeability and the transparency of the sheet or the storage container are not significantly reduced.

From the perspective of further increasing the oxygen permeability of the sheet or the storage container, the content of the first polyethylene (a-1), which has a lower density and high oxygen permeability, is preferably sufficiently higher than the content of the second polyethylene (a-2) having a higher density. From the above perspective, the total mass of the second polyethylene (a-2) relative to the total mass of the first polyethylene (a-1) is preferably 5.0 mass % or more and 30.0 mass % or less, more preferably 8.0 mass % or more and 15.0 mass % or less, and even more preferably 8.0 mass % or more and 11.0 mass % or less.

From the perspective of further increasing the oxygen permeability of the sheet or the storage container, the content of the second polyethylene (a-2) is preferably lower than the content of the polymethylpentene (b).

When the resin composition described above includes the hydrogenated block copolymer (c), from the perspective of further increasing the oxygen permeability of the sheet or the storage container, the content of the second polyethylene (a-2) is preferably lower than the content of the hydrogenated block copolymer (c).

When the resin composition described above includes the hydrogenated block copolymer (c), from the perspective of further increasing the strength of the sheet or the storage container, the content of the hydrogenated block copolymer (c) is preferably lower than the content of the first polyethylene (a-1).

That is to say, from the perspective of further enhancing both the oxygen permeability and the strength of the sheet or the storage container, the content of the hydrogenated block copolymer (c) is preferably higher than the content of the second polyethylene (a-2), and lower than the content of the first polyethylene (a-1).

Specifically, the content of the first polyethylene (a-1) relative to the total mass of the resin composition is preferably 50.0 mass % or more and 85.0 mass % or less, more preferably 50.0 mass % or more and 75.0 mass % or less, and even more preferably 50 mass % or more and 65 mass % or less. When the content of the first polyethylene (a-1) is 50.0 mass % or more, it is possible to further enhance the transparency of the sheet or the storage container. When the content of the first polyethylene (a-1) is 85.0 mass % or less, it is possible to further enhance the oxygen permeability and the moldability of the sheet or the storage container.

Furthermore, the content of the second polyethylene (a-2) relative to the total mass of the resin composition is preferably 1.0 mass % or more and 20.0 mass % or less, more preferably 1.0 mass % or more and 15.0 mass % or less, and even more preferably 1.0 mass % or more and 8.0 mass % or less. When the content of the second polyethylene (a-2) is 1.0 mass % or more, it is possible to further enhance the transparency of the sheet or the storage container. When the content of the second polyethylene (a-2) is 20.0 mass % or less, it is possible to further enhance the oxygen permeability of the sheet or the storage container.

Furthermore, the content of the polymethylpentene (b) relative to the total mass of the resin composition is preferably 5.0 mass % or more and 20.0 mass % or less, more preferably 8.0 mass % or more and 15.0 mass % or less, and even more preferably 8.0 mass % or more and 13.0 mass % or less. When the content of the polymethylpentene (b) is 5.0 mass % or more, it is possible to further enhance the oxygen permeability of the sheet or the storage container. When the content of the polymethylpentene (b) is 20.0 mass % or less, it is possible to further enhance the transparency of the sheet or the storage container.

Furthermore, the content of the hydrogenated block copolymer (c) relative to the total mass of the resin composition is preferably 15.0 mass % or more and 40.0 mass % or less, and more preferably 20.0 mass % or more and 40.0 mass % or less. When the content of the hydrogenated block copolymer (c) is 15.0 mass % or more, it is possible to further enhance the flexibility and the rubber elasticity of the sheet or the storage container. When the content of the hydrogenated block copolymer (c) is 40.0 mass % or less, it is possible to further enhance the transparency of the sheet or the storage container.

The content of the other additives described above may be a level that does not significantly reduce the oxygen permeability and the transparency of the sheet or the storage container, and the content of each may be, for example, 0.0 mass % or more and 1.5 mass % or less relative to the total mass of the resin composition.

The content of each component described above can be arbitrarily adjusted according to the transparency, oxygen permeability, and other characteristics required for the sheet or the storage container.

For example, the density difference between the first polyethylene (a-1) and the second polyethylene (a-2) may be 0.025 g/cm$^3$ or more and 0.045 g/cm$^3$ or less, the total mass of the second polyethylene (a-2) relative to the total mass of the first polyethylene (a-1) may be 8.0 mass % or more and 11.0 mass % or less, and further, relative to the total mass of the resin composition, the content of polyethylene (a) may be 50 mass % or more and 70 mass % or less, the content of the polymethylpentene may be 5.0 mass % or more and 15.0 or less, and the content of the hydrogenated block copolymer (c) may be 20.0 mass % or more and 40.0 mass % or less. With such a composition, a storage container can be obtained that contains a sheet whose oxygen permeability (PO$_2$) per unit thickness of the sheet is 1000 [mL·mm/(m$^2$·24 h·atm)] or more, and whose haze value is 50% or less.

Although the resin composition described above preferably includes the first polyethylene (a-1), the second polyethylene (a-2), and the polymethylpentene (b), the resin composition may include, for example, the first polyethylene (a-1) and the second polyethylene (a-2), and substantially not contain the polymethylpentene (b).

1-6. Method for Manufacturing Resin Composition

The resin composition can be manufactured by blending the components described above by an arbitrary known method. From the perspective of obtaining a resin composition in which the components are more uniformly dispersed, the resin composition is preferably produced by melt kneading the components described above using various kneaders such as a mixing roll, a kneader, a Banbury mixer, or an extruder. From the perspective of obtaining a resin composition in which the components are more uniformly dispersed, it is preferable to dry blend the components described above prior to melt kneading using a mixer such as a Henschel mixer or a tumbler, and then manufacture the resin composition by melt kneading the mixture obtained from the dry blend.

2. Sheet and Storage Container

The resin composition can be formed into a sheet by a known method including inflation molding, T-die molding, calender molding, or the like, to obtain a sheet for manufacturing a storage container. The sheet can be heat-welded into a bag shape and molded into the shape of a storage portion of a storage container.

Furthermore, the resin composition can be directly molded into a hollow container shape by a known method to obtain a storage container having a container-shaped storage portion. Moreover, the resin composition may be molded into a tube-shaped storage portion by a known molding method using an extruder, or a bottle-shaped storage portion by a molding method such as injection molding or blow molding.

The thickness of the molded sheet or the molded storage portion is preferably 150 μm or more and 400 μm or less. If the thickness of the sheet or the container is 150 μm or more, the strength of the sheet or the container is further enhanced, and consequently, partial stretching and the formation of pinholes in the sheet or the storage portion can be suppressed when a liquid such as a blood component is sealed and centrifuged. When the thickness of the sheet or the storage portion is 400 μm or less, molding is more easily performed, and the flexibility and the oxygen permeability of the sheet or the storage container can be further enhanced.

The oxygen permeability (PO$_2$) per unit thickness of the sheet or the storage portion is preferably 850 [mL·mm/(m$^2$·24 h·atm)] or more, and more preferably 1,000 [mL·mm/(m$^2$·24 h·atm)] or more. The PO$_2$ of the sheet or the storage portion may be a value measured in accordance with JIS K7126-1 (2006) at a temperature of 23° C. using a sheet or a storage portion molded having a thickness of 280 μm. For example, in the case of a sheet or a storage portion used as a blood product storage container, if the PO$_2$ of the sheet or the storage portion is 850 [mL·mm/(m$^2$·24 h·atm)] or more, the preservation of metabolic components such as platelets is further enhanced, and when the PO$_2$ is 1,000 [mL·mm/(m$^2$·24 h·atm)] or more, the preservation of metabolic components such as platelets is even further enhanced. The PO$_2$ of the sheet or the storage portion can be adjusted to the above ranges by adjusting the content of each component within the resin composition. For example, the PO$_2$ is further enhanced if the content of the polymethylpentene is increased.

The haze value per unit thickness of the sheet or the storage portion is preferably 55% or less, and more preferably 50% or less. The haze value of the sheet may be a value measured in accordance with JIS K7136 (2000) using a sheet or a storage portion molded having a thickness of 280 μm. For example, in the case of a sheet or a storage portion used as a blood product storage container, if the haze value of the sheet or the storage portion is 55% or less, inspection of the deterioration of platelets or the like by swirling confirmation becomes easier, and when the haze value is 50% or less, inspection of the deterioration of platelets or the like by swirling confirmation becomes even easier. The haze value of the sheet or the storage portion can be adjusted to the above ranges by adjusting the content of each component within the resin composition. For example, the haze value is further reduced if the content of the first polyethylene (a-1) or the hydrogenated block copolymer (c) is increased.

The carbon dioxide permeability (PCO$_2$) per unit thickness of the sheet or the storage portion is preferably 4,500 [mL·mm/(m$^2$·24 h·atm)] or more. The ratio between the carbon dioxide permeability and the oxygen permeability (PCO$_2$/PO$_2$) per unit thickness of the sheet or the storage portion is preferably 6.0 or less, and more preferably 5.5 or less. For example, in the case of a sheet or a storage portion used as a blood product storage container, if the PCO$_2$/PO$_2$ is 6.0 or less, the amount of carbon dioxide gas that escapes from the container and the amount of carbon dioxide gas produced due to metabolism by metabolic components such as platelets can be balanced. This promotes metabolism by metabolic components such as platelets, and the carbon dioxide gas generated by the metabolism maintains the balance of the carbonic acid buffering action of the plasma inside the storage container, which enables an increase in the pH of the plasma to be suppressed. The PCO$_2$ of the sheet or the storage portion may be a value measured in accordance with JIS K7126-1 (2006) at a temperature of 23° C. using a sheet or a storage portion molded having a thickness of 280 μm.

The 100% modulus of the sheet or the storage portion is preferably 2.7 MPa or more and 5.0 MPa or less. The tensile strength at break of the sheet or the storage portion is preferably 20 MPa or more. The 100% modulus of the sheet or the storage portion may be a 100% elongation tensile strength measured in accordance with JIS K 6251 (2017). The tensile elongation at break of the sheet or the storage portion is preferably 550% or more and 750% or less. The tensile strength at break and the tensile elongation at break of the sheet or the storage portion may be values measured in accordance with JIS K 7127 (1999).

The storage container described above includes storage containers having only a storage portion molded into a bag shape, and storage containers further including an accessory such as an introduction needle or a tube in addition to the storage portion. In the present specification, when it is stated that the storage container is molded from the resin composition, this indicates that at least the storage portion has been molded from the resin composition. The storage container can be connected to another storage container and used as a multiple container (multiple bag). The other storage container used in the multiple bag may be molded from the resin composition described above, or may be molded from another material.

The medical storage container of the present invention is applicable to, for example, a storage container for storing blood components (a blood product storage container for storing red blood cells, platelets, plasma, whole blood, and the like, or a cord blood storage container for storing cord blood), a body fluid storage container for storing body fluids other than blood (such as bone marrow fluid), as well as a cell storage container for storing liquids for culturing hematopoietic stem cells and the like.

EXAMPLES

The present invention will be described in more detail giving examples. However, the present invention is not limited by these examples.

1. Material Preparation 1-1. First Polyethylene (a-1) The polyethylene below was used as the first polyethylene (a-1).

PE-1A: Kernel KS240T manufactured by Japan Polyethylene Corporation. (density: 0.880 g/cm$^3$, metallocene plastomer, metallocene catalyst used, "Kernel" is a registered trademark of Japan Polypropylene Corporation)

1-2. Second Polyethylene (a-2)

One type of polyethylene below was used as the second polyethylene (a-2).

PE-2A: Nipolon-Z 7P02A manufactured by Tosoh Corporation (density: 0.920 g/cm$^3$, LLDPE, metallocene catalyst used, "Nipolon" is a registered trademark of Tosoh Corporation)

PE-2B: Nipolon-Z HF250K manufactured by Tosoh Corporation (density: 0.930 g/cm$^3$, LLDPE, metallocene catalyst used)

PE-2C: Nipolon-Z HF210K manufactured by Tosoh Corporation (density: 0.910 g/cm$^3$, LLDPE, metallocene catalyst used)

1-3. Polymethylpentene (b)

The polymethylpentene below was used as the polymethylpentene (b).

PMP: ABSORTOMER EP-1013 manufactured by Mitsui Chemicals, Inc. ("ABSORTOMER" is a registered trademark of Mitsui Chemicals, Inc.)

1-4. Hydrogenated Block Copolymer (c)

The SEBS below was used as the hydrogenated block copolymer (c).

SEBS: Kraton G1652E manufactured by Kraton Corporation ("Kraton" is a registered trademark of Kraton Polymers U.S. LLC)

1-5. Polypropylene

The polypropylene below was used as the polypropylene.

PP: Novatec FL02A manufactured by Japan Polypropylene Corporation ("Novatec" is a registered trademark of Japan Polypropylene Corporation)

2. Manufacturing of Resin Composition

The resin composition was produced by blending the first polyethylene (a-1), the second polyethylene (a-2), the polymethylpentene (b), and the hydrogenated block copolymer (c) in the ratios shown in Table 1 and Table 2.

The numerical value of each component in Table 1 and Table 2 represents the blending ratio (unit: mass %) of each component in the resin composition. The "ratio of (a-2) to (a-1)" presented in Table 1 and Table 2 represents the ratio of the total mass of the second polyethylene (a-2) to the total mass of the first polyethylene (a-1). In Tables 1 and 2, the numerical values shown in parentheses for the first polyethylene (a-1) and the second polyethylene (a-2) represent the density of each polyethylene (unit: g/cm$^3$).

TABLE 1

| | The first polyethylene (a-1) | The second polyethylene (a-2) | | | Polymethyl-Pentene | Hydrogenated Block Copolymer | Poly- | The ratio of (a-2) to (a-1) |
|---|---|---|---|---|---|---|---|---|
| | PE-1 A (0.880) | HF210K (0.910) | 7P02A (0.920) | HF250K (0.930) | (b) PMP | (c) SEBS | propylene PP | (%) |
| Test 1 | 45 | — | — | — | — | 40 | 15 | 0 |
| Test 2 | 67 | — | — | — | 18 | 15 | — | 0 |
| Test 3 | 85 | — | — | — | 15 | — | — | 0 |
| Test 4 | 85 | — | 10 | — | 5 | — | — | 12 |
| Test 5 | 30 | — | 15 | — | 20 | 35 | — | 50 |
| Test 6 | 50 | 5 | — | — | 10 | 35 | — | 10 |
| Test 7 | 50 | — | 5 | — | 10 | 35 | — | 10 |
| Test 8 | 50 | — | — | 5 | 10 | 35 | — | 10 |

TABLE 2

| | The first polyethylene (a-1) | The second polyethylene (a-2) | | | Polymethyl-Pentene | Hydrogenated Block Copolymer | Poly-propylene | The ratio of (a-2) to (a-1) (%) |
|---|---|---|---|---|---|---|---|---|
| | PE-1A (0.880) | HF210K (0.910) | 7P02A (0.920) | HF250K (0.930) | (b) PMP | (c) SEBS | PP | |
| Test 9 | 60 | 1 | — | — | 10 | 29 | — | 2 |
| Test 10 | 60 | 3 | — | — | 10 | 27 | — | 5 |
| Test 11 | 60 | 5 | — | — | 10 | 25 | — | 8 |
| Test 12 | 60 | 7 | — | — | 10 | 23 | — | 12 |
| Test 13 | 60 | 10 | — | — | 10 | 20 | — | 17 |
| Test 14 | 50 | 10 | — | — | 5 | 35 | — | 20 |
| Test 15 | 50 | 10 | — | — | 8 | 32 | — | 20 |
| Test 16 | 50 | 10 | — | — | 12 | 28 | — | 20 |
| Test 17 | 50 | 10 | — | — | 15 | 25 | — | 20 |
| Test 18 | 70 | 5 | — | — | 10 | 15 | — | 7 |

3. Manufacturing and Testing of Sheet

The resin compositions from test 1 to test 18 were used to manufacture sheets having a thickness of 280 μm, and the oxygen permeability and the haze value were measured using the following method.

3-1. Oxygen Permeability

The oxygen permeability [mL·mm/(m$^2$·24 h·atm)] per unit thickness of each sheet produced by the method above was measured in accordance with JIS K7126-1 (2006) at 23° C. using a GTR-31A manufactured by GTR TEC Corporation.

3-2. Haze Value

In each of the sheets produced by the method above, a central portion in the TD direction of the sheet at a position 5 m in the MD direction from the end of the sheet roll was cut out into a size of 45 mm×45 mm to obtain a test piece. Three test pieces were cut out at 1 m intervals in the MD direction, and the light transmittance was measured with a direct-read haze meter conforming to JIS K7136 (2000).

4. Results

The results are shown in Table 3.

TABLE 3

| Test | The oxygen permeability (ml·mm/m$^2$·24 h·atm) | The haze value (%) | Remarks |
|---|---|---|---|
| Test 1 | 768 | 19 | Comparative example |
| Test 2 | 1117 | 54 | Comparative example |
| Test 3 | 925 | 62 | Comparative example |
| Test 4 | 903 | 34 | Example |
| Test 5 | 1101 | 49 | Example |
| Test 6 | 1030 | 42 | Example |
| Test 7 | 1047 | 42 | Example |
| Test 8 | 782 | 40 | Example |
| Test 9 | 1010 | 47 | Example |
| Test 10 | 981 | 44 | Example |
| Test 11 | 1070 | 39 | Example |
| Test 12 | 923 | 37 | Example |
| Test 13 | 879 | 32 | Example |
| Test 14 | 877 | 25 | Example |
| Test 15 | 891 | 26 | Example |
| Test 16 | 908 | 29 | Example |
| Test 17 | 922 | 31 | Example |
| Test 18 | 931 | 44 | Example |

Compared with a sheet produced from a resin composition containing polyethylene, SEBS and polypropylene (test 1), the oxygen permeability increased in the sheet produced from a resin composition containing polymethylpentene instead of polypropylene (test 2), but the haze value was not improved as anticipated even when the amount of polyethylene in the resin composition was increased to enhance the transparency (test 2 and test 3).

In contrast, in sheets produced from a resin composition containing the first polyethylene (a-1), the second polyethylene (a-2) having a higher density than the first polyethylene, and the polymethylpentene (b) (test 4 to test 18), it was confirmed that the oxygen permeability can be increased while not significantly increasing the haze value.

In sheets produced from a resin composition containing the hydrogenated block copolymer (c), which is added to increase the flexibility and the rubber elasticity, it was confirmed that the oxygen permeability can be increased while not significantly increasing the haze value (tests 5 to 18).

As is clear from Table 3, by using a resin composition containing the first polyethylene (a-1), the second polyethylene (a-2) having a higher density than the first polyethylene, and the polymethylpentene (b), and adjusting the blend ratio of each component, it was confirmed that a sheet can be produced which has an oxygen permeability of 1,000 [mL·mm/(m$^2$·24 h·atm)] or more per unit thickness and a haze value of 50% or less.

Priority is claimed on Japanese Patent Application No. 2017-184044, filed Sep. 25, 2017, and the content described in the claims and the specification of the application are herein incorporated by reference.

INDUSTRIAL APPLICABILITY

According to the present invention, a medical storage container having an enhanced oxygen permeability and transparency can be manufactured. Therefore, for example, when the present invention is applied to a blood product storage container, the blood product can be stably stored for a longer period of time, and deterioration of the blood product after storage can be easily determined. The present invention specifically enables metabolic components such as blood platelets to be preserved for a longer period of time. As a result, the present invention is expected to contribute to the development of various fields that require storage of blood products.

What is claimed is:

1. A resin composition for manufacturing a medical storage container, the resin composition comprising:
polyethylene (a); and
polymethylpentene (b), wherein the polyethylene (a) comprises:
- a first polyethylene (a-1), that is a main component of the polyethylene (a), wherein a density of the first polyethylene (a-1) is 0.860 g/cm$^3$ or more and 0.890 g/cm$^3$ or less, and
- a second polyethylene (a-2) having a higher density than the first polyethylene (a-1), wherein an oxygen permeability per unit thickness of the resin composition is 1000 [mL·mm/(m$^2$·24 h·atm)] or more, and wherein a haze value per unit thickness of the resin composition is 50% or less.

2. The resin composition according to claim 1, wherein a content of the second polyethylene (a-2) is lower than a content of the polymethylpentene (b).

3. The resin composition according to claim 1, further comprising:
- a hydrogenated block copolymer (c) formed by hydrogenation of a block copolymer, wherein the hydrogenated block copolymer comprises:
  - at least two polymer blocks A mainly composed of a monomer unit derived from a vinyl aromatic compound, and
  - at least one polymer block B mainly composed of a monomer unit derived from a conjugated diene compound,
- wherein a content of the second polyethylene (a-2) is lower than a content of the hydrogenated block copolymer (c).

4. The resin composition according to claim 3, wherein a content of the hydrogenated block copolymer (c) is lower than a content of the first polyethylene (a-1).

5. A resin composition for manufacturing a medical storage container, the resin composition comprising:
- a first polyethylene (a-1), wherein a density of the first polyethylene (a-1) is 0.860 g/cm3 or more and 0.890 g/cm3 or less;
- a second polyethylene (a-2) having a higher density than the first polyethylene and a lower content than the first polyethylene;
- polymethylpentene (b); and
- a hydrogenated block copolymer (c) formed by hydrogenation of a block copolymer, the hydrogenated block copolymer comprising:
  - at least two polymer blocks A mainly composed of a monomer unit derived from a vinyl aromatic compound, and
  - at least one polymer block B mainly composed of a monomer unit derived from a conjugated diene compound, wherein an oxygen permeability per unit thickness of the resin composition is 1000 [mL·mm/(m2·24 h·atm)] or more, and wherein a haze value per unit thickness of the resin composition is 50% or less.

6. A sheet formed by molding the resin composition according to claim 1.

7. A medical storage container including a storage portion formed by molding the sheet according to claim 6 into a bag shape.

8. A medical storage container including a storage portion formed by molding the resin composition according to claim 1 into a bag shape.

* * * * *